US012776913B2

(12) United States Patent
Yun et al.

(10) Patent No.: US 12,776,913 B2
(45) Date of Patent: Oct. 27, 2026

(54) METHOD AND APPARATUS FOR MANAGING OFF-CHAIN DATA

(71) Applicant: 42DOT INC., Seoul (KR)

(72) Inventors: Geun Yong Yun, Yongin (KR); Seo Gue Kim, Seongnam (KR)

(73) Assignee: 42DOT INC., Seoul (KR)

( * ) Notice: Subject to any disclaimer, the term of this patent is extended or adjusted under 35 U.S.C. 154(b) by 0 days.

(21) Appl. No.: 18/829,382

(22) Filed: Sep. 10, 2024

(65) Prior Publication Data

US 2025/0088363 A1 Mar. 13, 2025

(30) Foreign Application Priority Data

Sep. 11, 2023 (KR) ........................ 10-2023-0120301

(51) Int. Cl.
*H04L 9/32* (2006.01)
*H04L 9/08* (2006.01)

(52) U.S. Cl.
CPC .......... *H04L 9/3236* (2013.01); *H04L 9/0836* (2013.01)

(58) Field of Classification Search
None
See application file for complete search history.

(56) References Cited

U.S. PATENT DOCUMENTS 12,088,541 B1 * 9/2024 Kheit .................... H04L 51/046
12,572,296 B2 * 3/2026 Fisher ..................... G06F 3/065
2024/0163118 A1 * 5/2024 Liu ........................... H04L 9/50
2024/0354753 A1 * 10/2024 Ness .................. G06Q 20/3827
2025/0045746 A1 * 2/2025 Mu ........................ G06Q 40/12

FOREIGN PATENT DOCUMENTS

CN 111782633 A * 10/2020 ............ G06F 16/27
CN 118631832 A * 9/2024 ............ G06F 16/27
CN 119691791 A * 3/2025
KR 10-2020-0096045 A 8/2020
KR 10-2022-0014095 A 2/2022
KR 10-2452250 B1 10/2022
KR 10-2564106 B1 8/2023
WO WO-2024001304 A1 * 1/2024 ............ G06F 3/064

OTHER PUBLICATIONS

KR Office Action dated Jun. 16, 2026.

* cited by examiner

*Primary Examiner* — Jeffrey R Swearingen
(74) *Attorney, Agent, or Firm* — Harvest IP Law, LLP

(57) ABSTRACT

Provided are a method of managing off-chain data and a device therefor. A method of operating a device that constitutes a blockchain network includes generating a first hash value regarding unit data using a first hash function and determining a target shard to store the unit data from among a plurality of shards based on the first hash value, transmitting a first request to store the unit data in the target shard to an external device, and obtaining a changed root value of the target shard changed as the unit data is stored from the external device, wherein the root value represents entire data stored in the target shard.

12 Claims, 13 Drawing Sheets

METHOD AND APPARATUS FOR MANAGING OFF-CHAIN DATA

CROSS-REFERENCE TO RELATED APPLICATION

This application is based on and claims priority under 35 U.S.C. § 119 to Korean Patent Application No. 10-2023-0120301, filed on Sep. 11, 2023, in the Korean Intellectual Property Office, the disclosure of which is incorporated by reference herein in its entirety.

BACKGROUND

1. Field

This disclosure relates to a method of managing off-chain data and an apparatus therefor.

2. Description of the Related Art

In relation to the blockchain technology, on-chain data refers to data stored directly inside a blockchain network, whereas off-chain data refers to data stored in a separate storage space outside the blockchain network.

When data in a blockchain network is managed as on-chain data according to the prior art, the integrity of the data may be guaranteed, but problems such as network capacity and data processing speed arise due to inefficiencies in data storage and data management.

On the other hand, when data in a blockchain network is managed as off-chain data, scalability and flexibility may be improved, but problems related to security vulnerabilities of a centralized data storage system and data integrity arise.

Therefore, for effective storage expansion, it is necessary to develop new technologies to reliably store off-chain data while ensuring persistence, availability, and integrity of data.

The above-mentioned background technology is technical information that the inventor possessed for deriving the present disclosure or acquired in the process of deriving the present disclosure and may not necessarily be considered as known technology disclosed to the general public before filing the application for the present disclosure.

SUMMARY

This disclosure provides a method of managing off-chain data and a device therefor. The problem to be solved by the disclosure is not limited to the problems mentioned above, and other problems and advantages of the disclosure that are not mentioned may be understood through the following description and will be understood more clearly through embodiments of the disclosure. Also, it will be appreciated that the problems to be solved by the disclosure and the advantages of the disclosure may be realized by the means disclosed in the patent claims and combinations thereof.

Additional aspects will be set forth in part in the description which follows and, in part, will be apparent from the description, or may be learned by practice of the presented embodiments of the disclosure.

According to a first aspect of the disclosure, there is provided a method of operating a device that constitutes a blockchain network, the method including generating a first hash value regarding unit data using a first hash function and determining a target shard to store the unit data from among a plurality of shards based on the first hash value, transmitting a first request to store the unit data in the target shard to an external device, and obtaining a changed root value of the target shard changed as the unit data is stored from the external device, wherein the root value represents entire data stored in the target shard.

According to a second aspect of the disclosure, there is provided a device that constitutes a blockchain network, the device including a communication module configured to communicate with an external device, a main memory in which at least one program is stored, and a processor configured to operate by executing the at least one program, wherein the processor is configured to generate a first hash value regarding unit data using a first hash function and determine a target shard to store the unit data from among a plurality of shards based on the first hash value, control the communication module to transmit a first request to store the unit data in the target shard to an external device, and control the communication module to obtain a changed root value of the target shard changed as the unit data is stored from the external device, and the root value represents entire data stored in the target shard.

According to a third aspect of the disclosure, there is provided a computer-readable recording medium having recorded thereon a program for causing the method of the first aspect of the disclosure to be executed on a computer.

Other aspects, features, and advantages will become apparent from the following drawings, claims, and detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
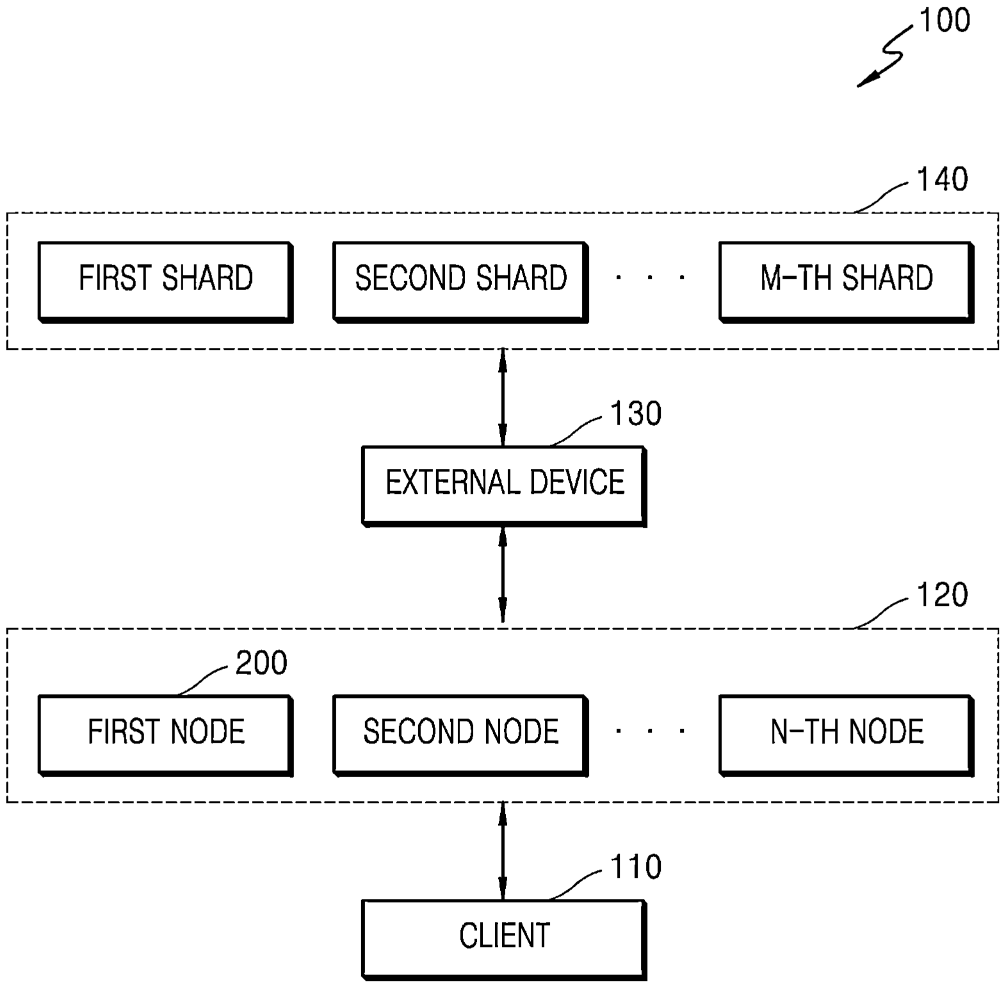
FIG. 1 is a schematic configuration diagram of a system including a client, a blockchain network, an external device, and a data storage system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The effects and features of the disclosure and the accompanying methods thereof will become apparent from the following description of the embodiments, taken in conjunction with the accompanying drawings. However, this is not intended to limit the disclosure to particular modes of practice, and it is to be appreciated that all changes, equivalents, and substitutes that do not depart from the spirit and technical scope of the disclosure are encompassed in the disclosure. The description of the embodiments is provided to enable the disclosure to be complete, and will fully convey the scope of the disclosure to one of ordinary skill in the art to which the disclosure belongs. In describing the present disclosure, when it is determined that detailed descriptions of related known technologies may obscure the gist of the present disclosure, the detailed descriptions will be omitted.

The terms used in the present specification are merely used to describe particular embodiments, and are not intended to limit the disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Some embodiments may be described in terms of functional block components and various processing steps. Such functional blocks may be realized by any number of hardware and/or software components configured to perform the specified functions. For example, the functional blocks of the disclosure may be implemented with one or more microprocessors or circuit configurations for certain functions. Also, the functional blocks of the disclosure may be implemented with any programming or scripting language. Functional blocks may be implemented in algorithms that are executed on one or more processors. Furthermore, the disclosure could employ any number of conventional techniques for electronics configuration, signal processing and/or control, data processing and the like. The words "mechanism", "element", "means", and "configuration" are used broadly and are not limited to mechanical or physical embodiments.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Hereinafter, the disclosure will be described in detail with reference to accompanying drawings.

FIG. 1 is a schematic configuration diagram of a system including a client, a blockchain network, an external device, and a data storage system according to an embodiment.

Referring to FIG. 1, the system 100 according to an embodiment may include a client 110, a blockchain network 120, an external device 130, and a data storage system 140. According to the disclosure, a device 200 for managing off-chain data (hereinafter referred to as a "device 200") may correspond to a blockchain node constituting the blockchain network 120.

The blockchain network 120 of the disclosure may include a P2P structured network including a plurality of nodes, and the nodes constituting the blockchain network 120 may include a desktop PC, a laptop PC, a tablet PC, a smartphone, a console device, and other mobile or non-mobile computing devices. However, the disclosure is not limited thereto.

Also, the client 110 according to an embodiment of the disclosure may include a user's terminal that provides a read request for reading data through the blockchain network 120 and/or a write request for writing data through the blockchain network 120. Alternatively, the client 110 according to an embodiment may include an intermediary terminal that transmits a read request or a write request from a user to the blockchain network 120.

Also, the data storage system 140 of the disclosure may include at least one database, and each database may include at least one storage device that may be implemented as a relational database (RDBMS) and/or a non-relational database (NoSQL), etc. The data storage system 140 according to an embodiment may be implemented by including a local server and/or a remote cloud server, but is not limited thereto.

Meanwhile, the data storage system 140 according to an embodiment may be implemented with a distributed storage structure based on database sharding. According to an embodiment, the data storage system 140 may include a plurality of shards, and data may be stored in each shard based on the process described later with reference to FIGS. 4 to 12, etc.

Also, the external device 130 of the disclosure refers to a device capable of accessing the data storage system 140. According to an embodiment, the external device 130 may include a device capable of directly accessing at least one shard constituting the data storage system 140 to store data in the data storage system 140 or read data stored in the data storage system 140.

Devices shown in FIG. 1 may communicate with one another and/or other devices through a network. A network is a comprehensive data communication network that enables different entities to communicate smoothly with each other and may include wired Internet, wireless Internet, and mobile wireless communication networks. For example, the network may include a local area network (LAN), a wide area network (WAN), a value added network (VAN), a mobile radio communication network, a satellite communication network, and a combination thereof. Also, the wireless communication may include, for example, wireless LAN (Wi-Fi), Bluetooth, Bluetooth low energy, ZigBee, Wi-Fi Direct (WFD), ultra-wideband (UWB), infrared communication data association (IrDA), and near field communication (NFC), but it is not limited thereto.

According to an embodiment, the client 110 may transmit a blockchain write request or a blockchain read request to at least one node constituting the blockchain network 120, i.e., the device 200, by performing communication through a network.

Also, according to an embodiment, the device 200 constituting the blockchain network 120 may transmit a first request for requesting to store unit data in a target shard or a second request for requesting to transmit data corresponding to a data identification value from the target shard to the external device 130 by performing communication through a network.

Also, according to an embodiment, the external device 130 may transmit a data identification value corresponding to unit data, a root value of a target shards that is changed due to storage of the unit data, or data corresponding to the data identification value to the device 200 by communicating through a network.

Figure 2:
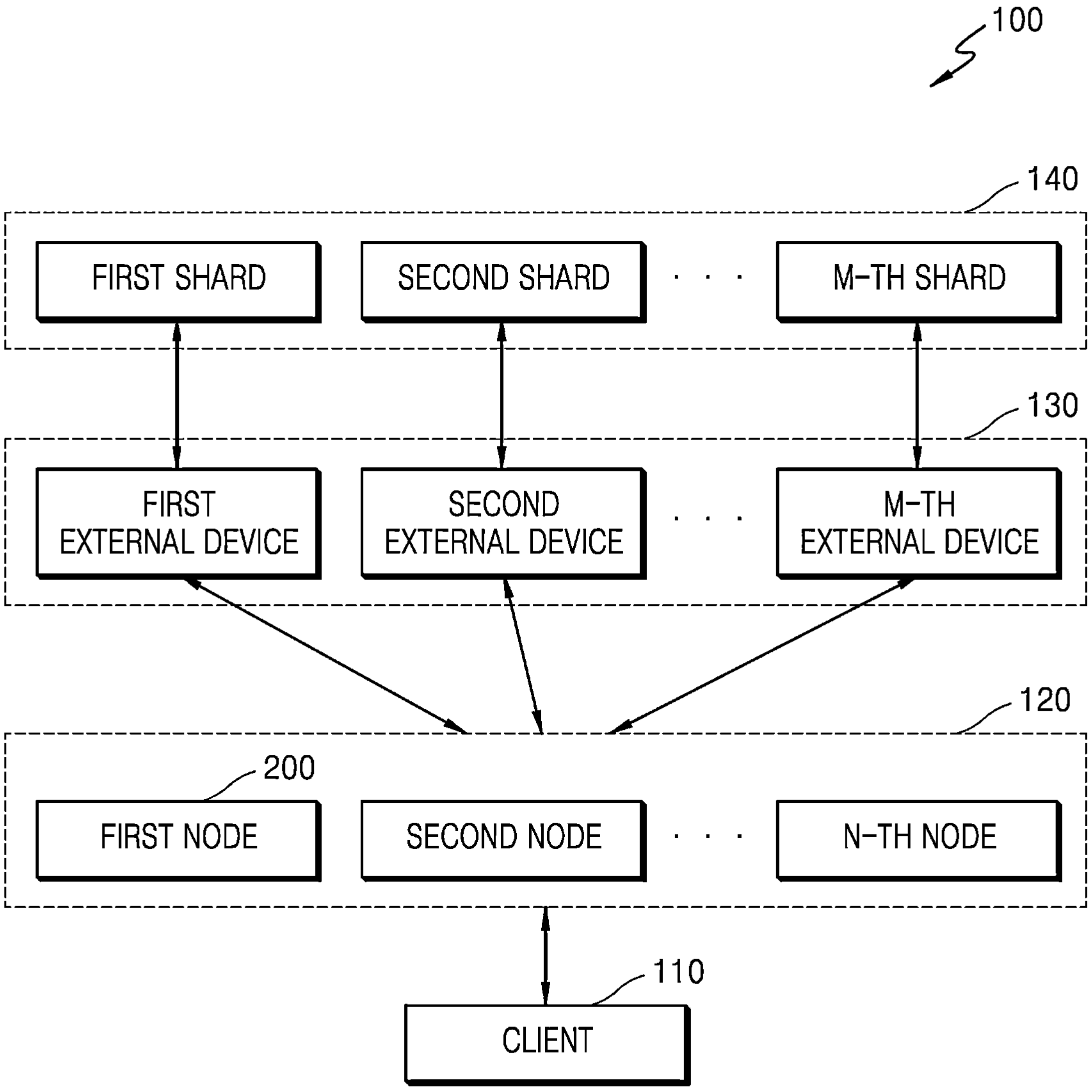
FIG. 2 is a schematic configuration diagram showing a plurality of devices respectively corresponding to a plurality of shards, according to an embodiment.

FIG. 2 is a schematic configuration diagram showing a plurality of devices respectively corresponding to a plurality of shards, according to an embodiment.

Referring to FIG. 2, the external device 130 according to an embodiment may include a plurality of devices respectively corresponding to a plurality of shards constituting the data storage system 140. According to an embodiment, the plurality of devices may each include a device capable of accessing data stored in a corresponding shard.

For example, the system 100 may include a first external device corresponding to a first shard, a second external device corresponding to a second shard, and an m-th external device corresponding to an m-th shard. At this time, the first external device may include a device capable of accessing the first shard, the second external device may include a device capable of accessing the second shard, and the m-th external device may include a device capable of accessing the m-th shard.

In other words, an m-th external device 130 may include a device capable of directly accessing the m-th shard from among shards constituting the data storage system 140 to store data in the m-th shard or read data stored in the m-th shard.

According to an embodiment, the data storage system 140 may include a target shard in which unit data that is the target of a write request or a read request from the client 110 is stored, and the external device 130 may include a device corresponding to the target shard.

Figure 3:
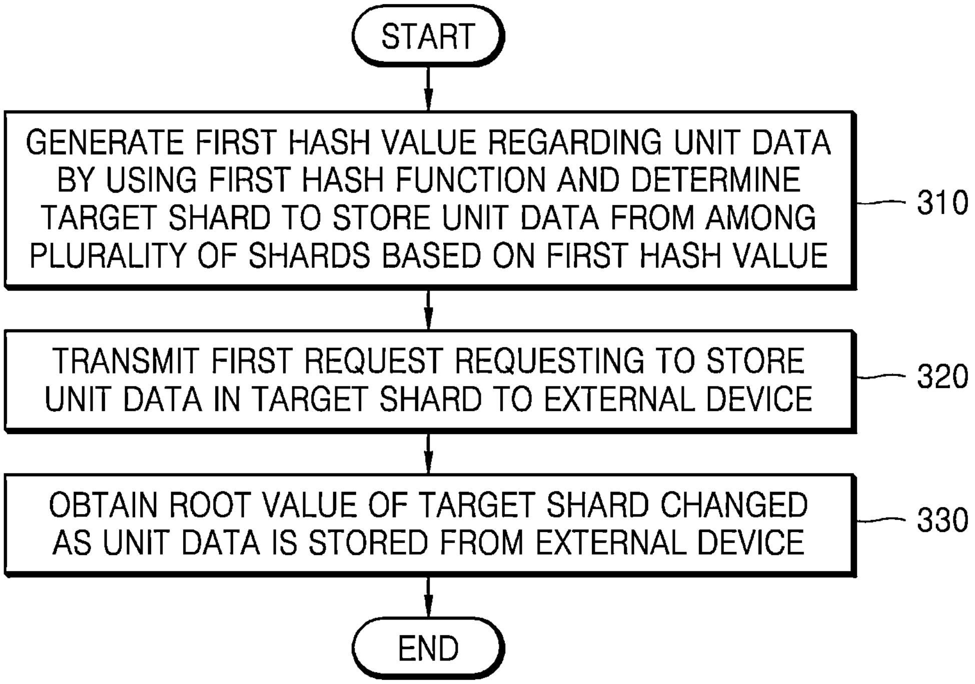
FIG. 3 is a diagram showing an example of a method of operating a device constituting a blockchain network.

FIG. 3 is a diagram showing an example of a method of operating a device constituting a blockchain network.

Referring to FIG. 3, in operation 310, the device 200 may generate a first hash value regarding unit data by using a first hash function and determine a target shard to store the unit data from among a plurality of shards based on the first hash value.

According to an embodiment, the device 200 may determine a shard having the remainder of the first hash value divided by the total number of the plurality of shards as a shard identification value as the target shard.

Also, according to an embodiment, the device 200 may receive a write request for unit data from a client and determine a target shard in response to the write request. At this time, the write request may include a request to invoke a write function of a smart contract.

In operation 320, the device 200 may transmit a first request for requesting to store unit data in the target shard to an external device.

An external device according to an embodiment may include a device corresponding to the target shard from among a plurality of devices respectively corresponding to the plurality of shards, and the plurality of devices may each include a device capable of accessing data stored in a corresponding shard.

The target shard according to an embodiment may store data in a Merkle Tree structure, and unit data may be stored in the target shard in association with a second hash value regarding the unit data generated by using a second hash function. At this time, the second hash value may be a leaf node constituting the Merkle Tree structure.

In operation 330, the device 200 may obtain the root value of the target shard changed due to the storage of unit data from an external device. At this time, the root value may represent all data stored in the target shard.

According to an embodiment, the device 200 may obtain a data identification value and a changed root value corresponding to unit data from the external device. At this time, the device 200 may store the data identification value and the root value as metadata linked to a smart contract.

Also, according to an embodiment, the device 200 may store a uniform resource identifier (URI) for identifying a stored location of the unit data as metadata linked to the smart contract.

Meanwhile, a URI according to an embodiment may be generated based on a shard identification value and a data identification value. Also, the URI according to an embodiment may include account information regarding an account that owns unit data.

According to an embodiment, the device 200 may receive a read request for unit data from a client and determine a target shard by using the first hash function in response to the read request. At this time, the read request may include a request to invoke a read function of the smart contract.

According to an embodiment, the device 200 may obtain a data identification value corresponding to the unit data by referring to metadata linked to the smart contract. The device 200 may transmit a second request to an external device requesting to transmit data corresponding to the data identification value from the target shard. The device 200 may obtain corresponding data from the external device.

Also, according to an embodiment, the device 200 may perform integrity verification on the corresponding data by comparing a verification value calculated based on the corresponding data with a root value. The device 200 may transmit the corresponding data on which integrity verification has been performed to the client.

Figure 4:
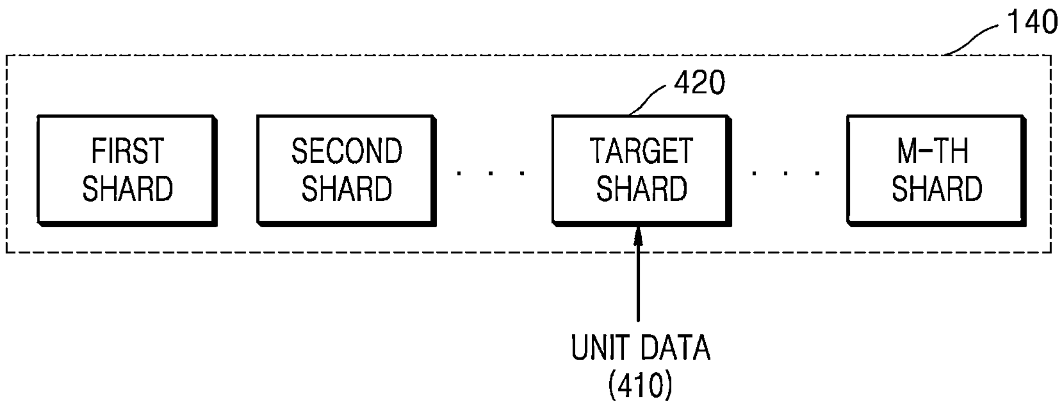
FIG. 4 is an example diagram illustrating the process of determining a target shard based on unit data.

FIG. 4 is an example diagram illustrating the process of determining a target shard based on unit data.

Referring to FIG. 4, the device 200 may generate a first hash value regarding unit data 410 by using a first hash function and determine a target shard 420 to store the unit data 410 from among a plurality of shards based on the first hash value. At this time, the unit data 410 may include data that is a unit of a request from the client 110 or a unit of processing of the external device 130 and may include data including text. However, the disclosure is not limited thereto.

The first hash function according to an embodiment may include a variety of hash functions, such as a function based on bit operations, a function based on polynomial operations, or a function corresponding to combinations of various operation methods. The first hash function may include MD5, SHA series, Blake2, Whirlpool, or RipeMD, and the first hash function according to an embodiment may include keccak256, but is not limited thereto.

According to an embodiment, the data storage system 140 may include first to m-th shards, and, in this case, each shard may have the value of 1 to m as the shard identification value. According to an embodiment, the device 200 may determine a shard having the remainder of the first hash value divided by the total number of the plurality of shards as a shard identification value as the target shard 420.

For example, the device 200 may use keccak256 as the first hash function to generate a first hash value having the length of 256 bits and corresponding to the unit data 410. The device 200 may determine a shard having the remainder of the first hash value divided by m, which is the total number of the plurality of shards, as a shard identification value as the target shard 420. At this time, the remainder may be any one of 1 to m.

Also, according to an embodiment, the device 200 may receive a write request for the unit data 410 from the client 110 and determine the target shard 420 in response to the write request. At this time, the write request may include a request to invoke a write function of a smart contract.

For example, the write request may include a request to store the unit data 410 in the data storage system 140. At this time, in a smart contract running on the blockchain network 120, a write request may include a transaction invoking a write function of the smart contract.

According to an embodiment, the device 200 may receive a transaction invoking a write function of the smart contract. As a result of the operation of an invoked write function, the device 200 may transmit a request for requesting to store the unit data 410 in the target shard 420 to the external device 130, and thus the unit data 410 may be stored in the data storage system 140.

According to an embodiment, the device 200 may receive a write request for requesting to store the unit data 410 in the data storage system 140 from the client 110, determine a target shard 420 corresponding to the unit data 410, and transmit a first request for requesting to store the unit data 410 in the target shard 420 to the external device 130. At this time, the first request may include an event that occurred in the smart contract. The internal logic of a smart contract according to an embodiment may be programmed to generate a specific event when a predetermined condition is met.

Figure 5:
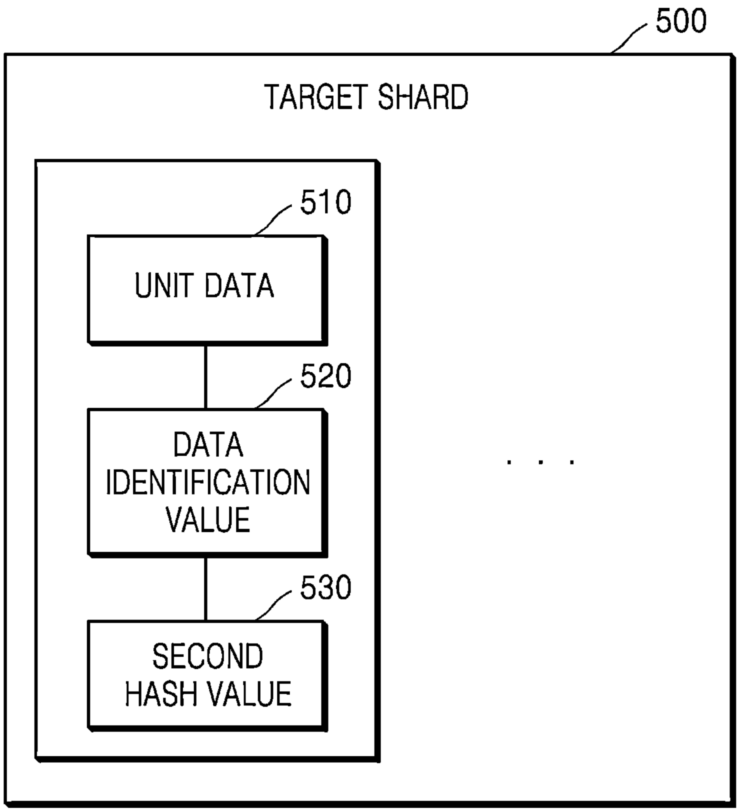
FIG. 5 is an example diagram illustrating unit data stored in association with a data identification value and a second hash value.

FIG. 5 is an example diagram illustrating unit data stored in association with a data identification value and a second hash value. A target shard 500 shown in FIG. 5 may correspond to the target shard 420 shown in FIG. 4, and unit data 510 shown in FIG. 5 may correspond to the unit data 410 shown in FIG. 4.

Referring to FIG. 5, the unit data 510 may be stored in the target shard 500 in association with a data identification value 520 and a second hash value 530. For example, when the target shard 500 is implemented as a relational database, the unit data 510 may be stored in a table in the same row as the data identification value 520 and the second hash value 530, according to a table structure. In another example, when the target shard 500 is implemented as a non-relational database, the unit data 510 may be stored together with the second hash value 530 by using the data identification value 520 as a key, according to a key-value structure.

According to an embodiment, the second hash value 530 may be generated by using a second hash function. The second hash function may include a variety of hash functions, such as a function based on bit operations, a function based on polynomial operations, or a function corresponding to combinations of various operation methods. The second hash function may include MD5, SHA series, Blake2, Whirlpool, or RipeMD, and the second hash function according to an embodiment may include a function identical to the first hash function described above with reference to FIG. 4, but is not limited thereto.

The target shard 500 may store the unit data 510 in association with the data identification value 520, thereby enabling the unit data 510 to be uniquely identified and improving data inquiry efficiency. Also, the target shard 500 may store the unit data 510 in association with the second hash value 530, thereby enabling the device 200 to verify the integrity of data.

Meanwhile, the unit data 510 may be stored in the target shard 500 in association with the second hash value 530, and thus the target shard 500 may store data in the Merkle Tree structure using the second hash value 530 as a leaf node. According to an embodiment, the unit data 510 may be stored in the target shard 500 as data having one of various data structures such as a JSON structure or an XML structure.

Figure 6:
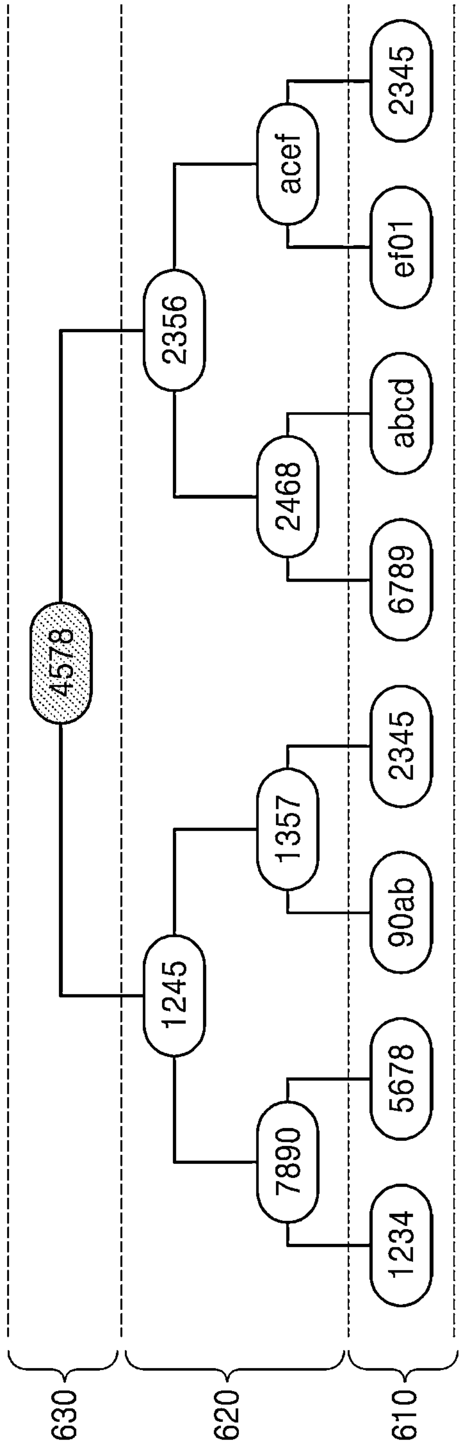
FIG. 6 is an example diagram illustrating the data storage structure of a target shard.

FIG. 6 is an example diagram illustrating the data storage structure of a target shard.

The target shard 500 according to an embodiment may store data in a Merkle Tree structure, and the unit data 510 may be stored in the target shard 500 in association with the second hash value 530 regarding the unit data generated by using a second hash function. At this time, the second hash value 530 may be a leaf node constituting the Merkle Tree structure.

According to an embodiment, the target shard 500 may store data in the Merkle Tree structure, and the Merkle Tree structure may include a binary Merkle Tree structure as shown in FIG. 6, or may include a Merkle Patricia Tree structure unlike that in FIG. 6.

Meanwhile, the Merkle Tree structure is not limited to the above-described structures, is a structure using the second hash value 530 corresponding to the unit data 510 as a leaf node, and may include various hierarchical structures in which a root value representing the entire data stored in the target shard 500 may be determined based on the leaf node.

Referring to FIG. 6, the target shard 500 according to an embodiment may store data in the binary Merkle Tree structure. The Merkle Tree structure according to an embodiment may include a leaf node layer 610, a non-leaf node layer 620, and a root layer 630. Meanwhile, values such as 4578 shown in FIG. 6 may be understood as a simplification of values represented by respective nodes constituting the Merkle Tree structure.

According to an embodiment, the target shard 500 may configure the leaf node layer 610 by using a plurality of second hash values 530 respectively corresponding to a plurality of pieces of unit data 510 as leaf nodes. The leaf node layer 610 is the lowest layer of the Merkle Tree structure, and the leaf node values constituting the leaf node layer 610 may correspond to the respective prices of unit data 510.

The non-leaf node layer 620 is a parent layer of the leaf node layer 610, and each of non-leaf nodes constituting the non-leaf node layer 620 may represent a value generated based on the value of a nearest child node. For example, a non-leaf node, which is the parent node to a leaf node representing the value of 1234 and a leaf node representing the value of 5678, may generate the value of 7890 based on the value of 1234 and the value of 5678, and the non-leaf node may represent the value of 7890.

Meanwhile, the non-leaf node layer 620 may include a plurality of detailed layers as shown in FIG. 6. In other words, the value represented by at least one non-leaf node may be generated based on not only a value represented by the leaf node, but also a value represented by another non-leaf child node. For example, a non-leaf node, which is the parent node to a non-leaf node representing the value of 7890 and a leaf node representing the value of 1234, may generate the value of 1245 based on the value of 7890 and the value of 1357, and the non-leaf node may represent the value of 1245.

The root layer 630 according to an embodiment is the highest layer of the Merkle Tree structure and includes only one node. At this time, it may be understood that the only one node is identical to a Merkel root and may represent only one value representing data of the entire Merkel Tree structure.

For example, the root layer 630 may represent the value of 4578, and the value represented by the root layer 630 may be determined based on all leaf nodes included in the leaf node layer 610.

In the disclosure, the root value refers to the value of the root layer 630 determined based on leaf nodes, and the root value according to an embodiment may represent entire data stored in the target shard 500.

Figure 7:
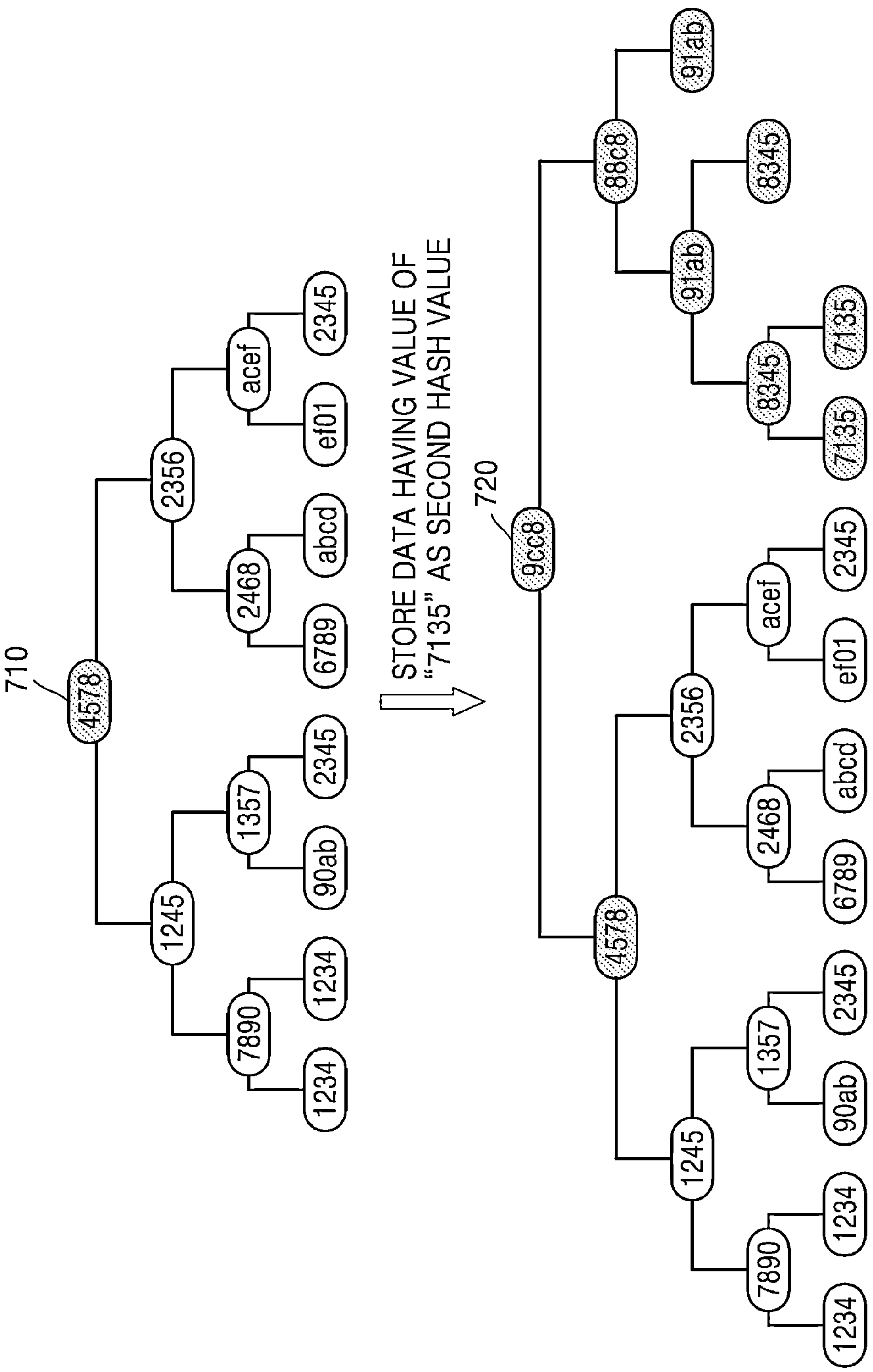
FIG. 7 is an example diagram illustrating the root value of a target shard that is changed as unit data is stored.

FIG. 7 is an example diagram illustrating the root value of a target shard that is changed as unit data is stored.

According to an embodiment, when the unit data 510 is stored in the target shard 500, a leaf node representing the second hash value corresponding to the unit data 510 may be added to the leaf node layer 610 of the Merkle Tree structure of the target shard 500.

Referring to FIG. 7, when the unit data 510, which is data having the second hash value 530 of 7135, is stored in the target shard 500, a leaf node representing the value of 7135 may be added to the leaf node layer 610. Here, before the unit data 510 is stored, the Merkle Tree structure may have a prior-to-change Merkle root 710 as the root value. After the unit data 510 is stored, the Merkle Tree structure may have a changed Merkle root 720 as the root value.

Meanwhile, in the case of the binary Merkle Tree structure shown in FIG. 7, one root value is calculated only when every layer includes an even number of nodes. Therefore, a layer including an odd number of nodes may further include a dummy node representing a value represented by an adjacent node of the same layer.

According to an embodiment, the external device 130 may transmit a changed root value to the device 200 every time new data is stored in the target shard 500. The device 200 may obtain a changed root value 720, which is changed as the unit data 510 is stored, from the external device 130. At this time, the changed root value 720 may represent entire data stored in the target shard 500, including the unit data 510.

Meanwhile, according to another embodiment, every time new data is stored in the target shard 500, the external device 130 may transmit the second hash value for the new data and a verification path value for the new data to the device 200. At this time, the device 200 may obtain a root value calculated based on the second hash value for the new data and the verification path value for the new data as the changed root value 720.

According to an embodiment, the device 200 may obtain the data identification value 520 and the changed root value 720 corresponding to the unit data 510 from the external device 130. At this time, the device 200 may store the data identification value 520 and the changed root value 720 as metadata linked to a smart contract.

According to an embodiment, since the metadata linked to the smart contract includes the data identification value 520, the device 200 may check the data identification value 520 by referring to the metadata, and thus it may be checked whether the unit data 510 included in a write request is data already stored in the data storage system 140.

According to another embodiment, the device 200 may check the target shard 500 in which data included in a read request is stored by checking the data identification value 520 with reference to the metadata.

According to another embodiment, the device 200 may verify the integrity of the unit data 510 stored in the target shard 500 by checking the changed root value 720 with reference to the metadata.

Meanwhile, according to an embodiment, the device 200 may store a uniform resource identifier (URI) for identifying a stored location of the unit data 510 as metadata linked to the smart contract. A URI refers to a unique identifier that represents a resource on the web.

A URI according to an embodiment may be generated based on a shard identification value and a data identification value. According to an embodiment, a URI for identifying the stored location of the unit data 510 may include the shard identification value of the target shard 500 corresponding to the unit data 510 and the data identification value 520 corresponding to the unit data 510.

According to an embodiment, the blockchain network 120 may consider data stored in the data storage system 140 as a resource on the web and access the data storage system 140 by using a URI that uniquely represents the resource on the web. The blockchain network 120 according to an embodiment may support the client 110 to access blockchain data by using a URI. Therefore, the blockchain network 120 may implement a decentralized web utilizing off-chain data.

Meanwhile, the URI according to an embodiment may include account information regarding an account that owns the unit data 510. The unit data 510 may include data owned by a specific owner, and, in this case, the unit data 510 may be dependent on an account corresponding to the owner. The unit data 510 dependent on a specific account may include data that may only be accessed through the specific account.

A URI according to an embodiment may include account information, and the account information may include an account address, a public key for encryption and digital signature, an alias that may correspond to the account, etc.

Here, the alias may include a specific text that may be used instead of a complex account address. In order to set an alias representing a specific account, the device 200 may compare an alias included in existing account information with an alias included in an alias setting request received from the client 110, based on the alias setting request.

As a result of the comparison, when the alias included in the existing account information does not overlap the alias included in the account setting request, the device 200 may store the alias included in the account setting request as metadata liked to a smart contract, such that the alias included in the account setting request represents the specific account.

According to an embodiment, the URI corresponding to unit data 510 may include an account address, a shard identifier of the target shard 500, and a data identification value 520. According to another embodiment, the URI corresponding to the unit data 510 may include an alias corresponding to a specific account instead of an account address, from among the above-described components.

Meanwhile, according to an embodiment, metadata linked to a smart contract may include metadata that is dependent on account specific metadata (ASM) and global metadata (GM), which is not dependent on a specific account.

Here, information regarding the unit data 510 dependent on a specific account may be managed as ASM, and ASM according to an embodiment may include the shard identification value of the target shard 500 corresponding to the unit data 510, the data identification value 520, and a URI.

GM according to an embodiment may enable verification of integrity of data by including root values of respective shards constituting the data storage system 140. Also, GM according to an embodiment may include a mapping relationship between accounts and aliases.

Figure 8:
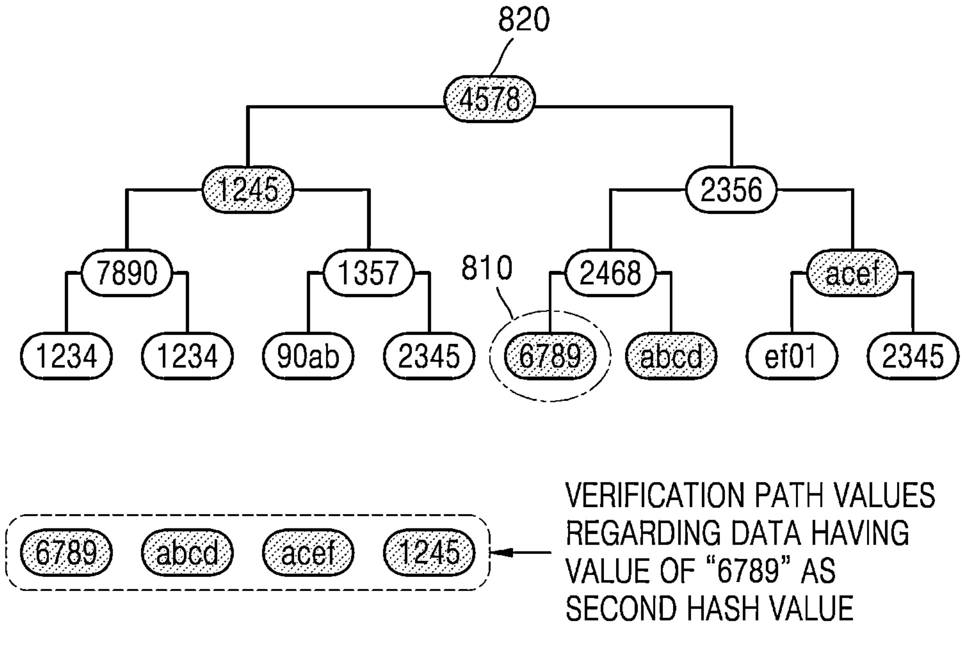
FIG. 8 is an example diagram illustrating a process of performing integrity verification on data by comparing a verification value with the root value of a target shard.

FIG. 8 is an example diagram illustrating a process of performing integrity verification on data by comparing a verification value with the root value of a target shard.

According to an embodiment, the device 200 may receive a read request for the unit data 510 from the client 110 and determine the target shard 500 by using the first hash function in response to the read request. Here, the process of determining the target shard 500 may be identical to the process of determining the target shard 500 described above with reference to FIG. 4.

A read request according to an embodiment may include a request to invoke a read function of the smart contract. For example, the read request may include a request to read the unit data 510 from the data storage system 140. At this time, the read request may include a transaction to invoke a read function of the smart contract.

According to an embodiment, a read request may not include the unit data 510. Instead, the read request may include an identifier indicating the unit data 510, a shard identification value of the target shard 500, a data identification value 520, and/or a URI.

According to another embodiment, the device 200 may obtain the data identification value 520 corresponding to the unit data 510 by referring to metadata linked to the smart contract.

According to an embodiment, the device 200 may receive a transaction invoking a read function of the smart contract. As a result of the operation of an invoked read function, the device 200 may transmit a request for requesting to read data corresponding to the data identification value 520 from the target shard 500 to the external device 130, and thus the external device 130 may transmit the unit data 510 from the data storage system 140 to the device 200 or the client 110.

According to an embodiment, the device 200 may receive a read request for requesting to read the unit data 510 from the data storage system 140 from the client 110, determine the target shard 500 corresponding to the unit data 510, and transmit to the external device 130 a second request for requesting to transmit data corresponding to the data identification value 520. At this time, the second request may include an event that occurred in the smart contract. The device 200 may obtain data corresponding to the data identification value 520 from the external device 130.

At this time, the device 200 may perform integrity verification on the data corresponding to the data identification value 520, which is obtained from the external device 130, and transmit integrity-verified data to the client 110.

Referring to FIG. 8, the device 200 may perform integrity verification on corresponding data 810 corresponding to the data identification value 520 by comparing a verification value 820 calculated based on the corresponding data 810 with the changed root value 720.

According to an embodiment, the device 200 may obtain at least one verification path value based on the corresponding data 810 and calculate the verification value 820 based on an obtained verification path value. At this time, it may be understood that a verification path value is Merkle proof in the Merkle Tree structure.

For example, when data corresponding to the leaf node representing the value of 6789 shown in FIG. 8 is the corresponding data 810 corresponding to the data identification value 520, the device 200 may obtain the value of 6789, the value of abcd, the value of acef, and the value of 1245 as verification path values for calculating the verification value 820. At this time, the verification path values may be transmitted from the target shard 500 to the device 200 via the external device 130.

According to an embodiment, the device 200 may calculate the verification value 820 based on verification path values by performing an operation identical to the operation for calculating a root value based on a leaf node.

According to an embodiment, the device 200 may compare the calculated verification value 820 with the changed root value 720 stored as metadata of a smart contract. As a result of the comparison, when the verification value 820 is identical to the changed root value 720 stored as metadata of the smart contract, it may be determined that the integrity of the corresponding data 810 is verified. At this time, the device 200 may transmit the integrity-verified corresponding data 810, the integrity to the client 110.

Figure 9:
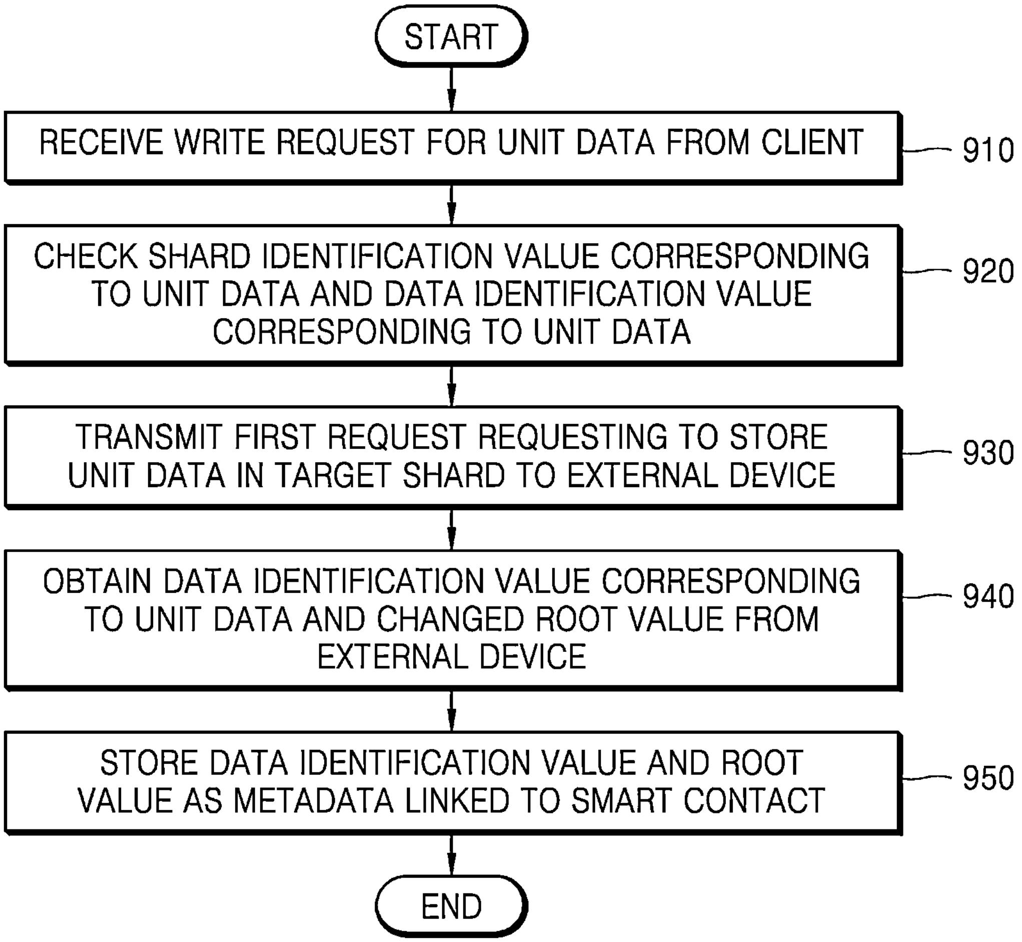
FIGS. 9 and 10 are diagrams showing examples of a method of operating a device constituting a blockchain network in the process of storing data in a target shard and in the process of obtaining data from a target shard.
Figure 10:
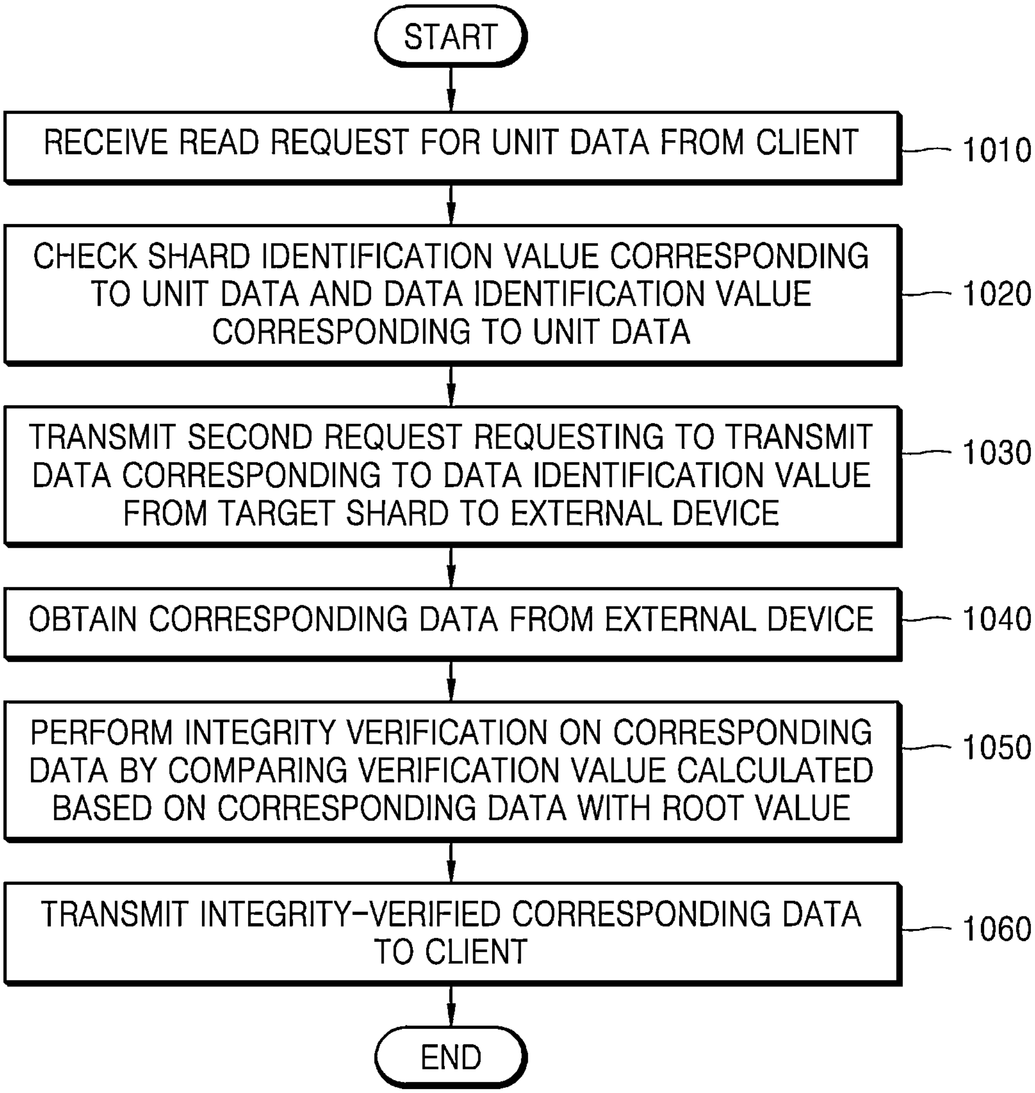

FIGS. 9 and 10 are diagrams showing examples of a method of operating a device constituting a blockchain network in the process of storing data in a target shard and in the process of obtaining data from a target shard.

FIGS. 9 and 10 are diagrams illustrating the operation process of the device 200 described above with reference to FIGS. 1 to 8 in time series, and some of overlapping descriptions may be omitted.

Referring to FIG. 9, in operation 910, the device 200 may receive a write request for the unit data 510 from the client 110.

In operation 920, the device 200 that has received the write request may check the shard identification value corresponding to the unit data 510 and the data identification value 520 corresponding to the unit data 510.

According to an embodiment, the device 200 may generate a first hash value regarding unit data 510 by using a first hash function and determine a shard identification value corresponding to the unit data 510 based on the first hash value.

According to an embodiment, the device 200 may check the shard identification value corresponding to the unit data 510, the data identification value 520, and/or a URI by referring to metadata of a smart contract.

At this time, the device 200 may determine whether the unit data 510, which is the target of the write request, is already stored in the data storage system 140 or not by referring to the metadata of the smart contract.

When the unit data 510 is already stored, the device 200 may reject the write request from the client 110.

On the other hand, when the unit data 510 is not stored, in operation 930, the device 200 may transmit a first request for requesting to store the unit data 510 in the target shard 500 to the external device 130.

At this time, the first request may include an event that occurred in the smart contract. According to an embodiment, the event may include at least one of an event identifier, a shard identification value of the target shard 500, and the data identification value 520 corresponding to the unit data 510.

In operation 940, the device 200 may obtain the data identification value 520 and the changed root value 720 corresponding to the unit data 510 from the external device 130.

In operation 950, the device 200 may store the data identification value 520 and the changed root value 720 as metadata linked to a smart contract.

Metadata linked to a smart contract is on-chain data and may be updated as the unit data 510 of the disclosure, i.e., off-chain data, is stored. The blockchain network 120 may manage the most recently changed root value as metadata linked to a smart contract, and the integrity of data stored in the data storage system 140 may be verified based on the metadata linked to a smart contract.

Referring to FIG. 10, in operation 1010, the device 200 may receive a read request for the unit data 510 from the client 110.

In operation 1020, the device 200 that has received the read request may check the shard identification value corresponding to the unit data 510 and the data identification value 520 corresponding to the unit data 510.

According to an embodiment, the device 200 may check the shard identification value corresponding to the unit data 510, the data identification value 520, and/or a URI by referring to metadata of a smart contract.

According to another embodiment, the device 200 may check the shard identification value, the data identification value 520, and/or a URI included in the read request.

At this time, the device 200 may determine whether data corresponding to the data identification value 520, which is the target of the read request, is already stored in the data storage system 140.

When the data corresponding to the data identification value 520 is not stored, the device 200 may reject the read request from the client 110.

Meanwhile, when the data corresponding to the data identification value 520 is stored, in operation 1030, the device 200 may transmit to the external device 130 a second request for requesting to transmit the corresponding data 810 corresponding to the data identification value 520 from the target shard 500.

In operation 1040, the device 200 may obtain the corresponding data 810 from the external device 130.

In operation 1050, the device 200 may perform integrity verification on the corresponding data 810 by comparing the verification value 820 calculated based on the corresponding data 810 with the changed root value 720.

In operation 1060, the device 200 may transmit the integrity-verified corresponding data 810 to the client 110.

Figure 11:
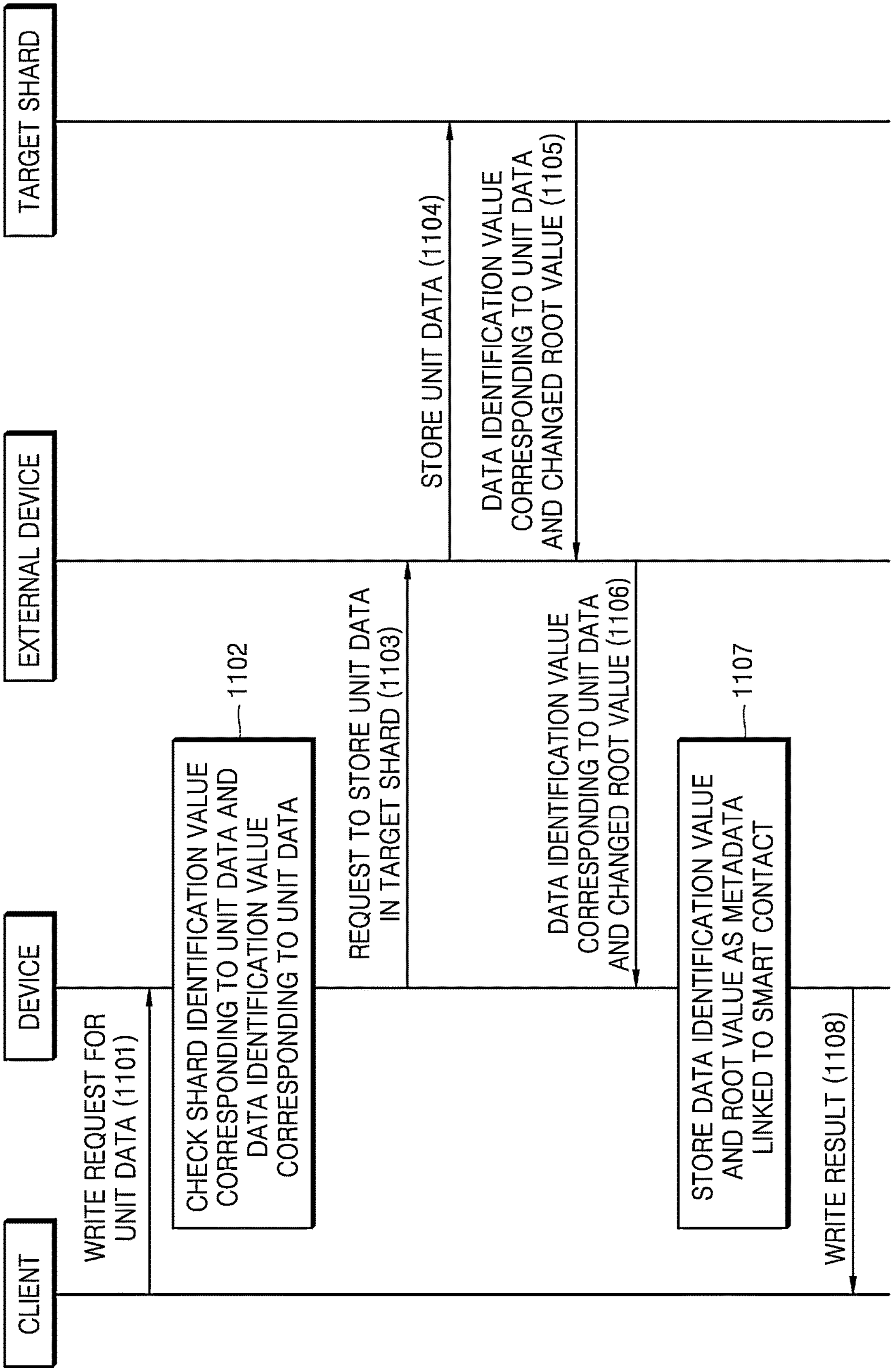
FIGS. 11 and 12 are example diagrams illustrating a process of storing data in a target shard and a process of obtaining data from a target shard.
Figure 12:
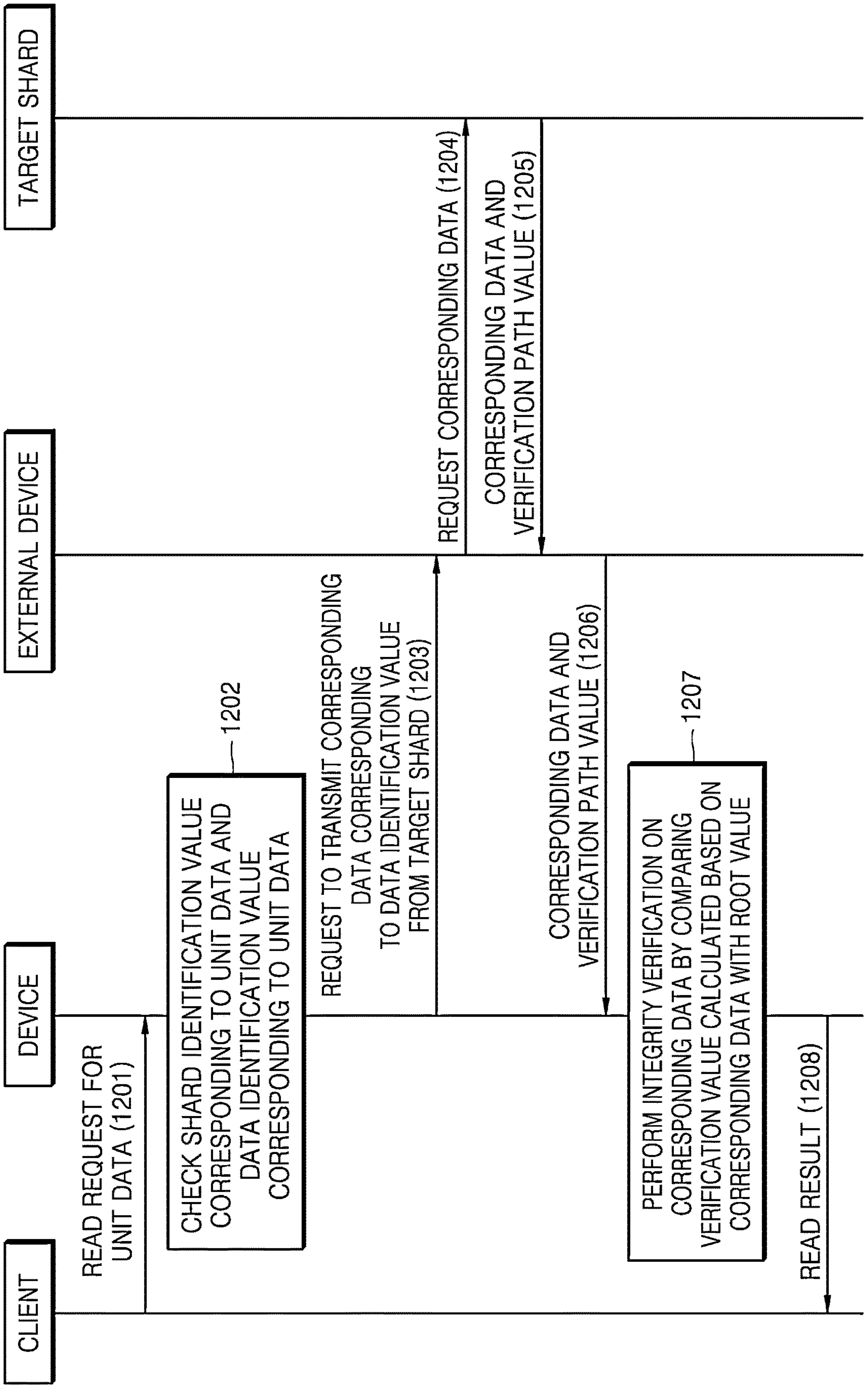

FIGS. 11 and 12 are example diagrams illustrating a process of storing data in a target shard and a process of obtaining data from a target shard.

FIGS. 11 and 12 are diagrams illustrating the operation processes of subjects constituting the system 100 described above with reference to FIGS. 1 to 8 in time series, and some of overlapping descriptions may be omitted.

Referring to FIG. 11, in operation 1101, the client 110 may transmit a write request for the unit data 510 to the device 200.

According to an embodiment, the client 110 may transmit a write request for the unit data 510 to the device 200 via a server (e.g., an API server) that provides a programming interface for interaction with the blockchain network 120. For example, the client 110 may transmit a write request to the API server, and the API server may transmit a received write request to the device 200.

In operation 1120, the device 200 may check the shard identification value corresponding to the unit data 510 and the data identification value 520 corresponding to the unit data 510.

In operation 1103, the device 200 may request the external device 130 to store the unit data 510 in the target shard 500.

According to an embodiment, a request to store the unit data 510 in the target shard 500 may include an event that occurred in a smart contract of the blockchain network 120, and the device 200 may transmit the occurred event. to a broker device. At this time, the broker device may transmit a request determined by processing and analyzing a received event to the external device 130, thereby allowing the external device 130 to store the unit data 510 in the target shard 500.

In operation 1104, the external device 130 may store the unit data 510 in the target shard 500.

In operation 1105, the external device 130 may obtain the data identification value 520 corresponding to the unit data 510 and the changed root value 720 from the target shard 500.

In operation 1106, the external device 130 may transmit the data identification value 520 corresponding to the unit data 510 and the changed root value 720 to the device 200.

According to an embodiment, the external device 130 may transmit at least one from among an event identifier regarding a request to store the unit data 510 in the target shard 500, the changed root value 720, and the data identification value 520 to the device 200 by invoking a call-back function of a smart contract.

In operation 1107, the device 200 may store the data identification value 520 and the changed root value 720 as metadata linked to a smart contract.

According to an embodiment, the device 200 determines whether an event identifier transmitted from the external device 130 is identical to an event identifier regarding the request to store unit data 510 in the target shard 500 and, when event identifiers are identical to each other, may store the data identification value 520 and the changed root value 720 as metadata linked to the smart contract.

In operation 1108, the device 200 may transmit a write result corresponding to the write request to the client 110.

Referring to FIG. 12, in operation 1201, the client 110 may transmit a read request for the unit data 510 to the device 200.

According to an embodiment, the client 110 may transmit a read request for the unit data 510 to the device 200 via a server (e.g., an API server) that provides a programming interface for interaction with the blockchain network 120. For example, the client 110 may transmit a read request to the API server, and the API server may transmit a received read request to the device 200.

In operation 1202, the device 200 may check the shard identification value corresponding to the unit data 510 and the data identification value 520 corresponding to the unit data 510.

In operation 1203, the device 200 may request the external device 130 to transmit the corresponding data 810 corresponding to the data identification value 520 from the target shard 500.

According to an embodiment, a request to transmit the corresponding data 810 corresponding to the data identification value 520 from the target shard 500 may include an event occurred in a smart contract of the blockchain network 120, and the device 200 may transmit the occurred event to a broker device. At this time, the broker device may transmit a request determined by processing and analyzing a received event to the external device 130, thereby allowing the external device 130 to transmit the corresponding data 810 corresponding to the data identification value 520 from the target shard 500.

In operation 1204, the external device 130 may request the corresponding data 810 to the target shard 500.

In operation 1205, the external device 130 may obtain the corresponding data 810 and a verification path value.

In operation 1206, the external device 130 may transmit the corresponding data 810 and the verification path value to the device 200.

According to an embodiment, the external device 130 may transmit at least one from among an event identifier regarding a request to transmit the corresponding data 810 corresponding to the data identification value 520 from the target shard 500, the corresponding data 810, and a verification path value regarding the corresponding data 810 to the device 200 by invoking a call-back function of a smart contract.

In operation 1207, the device 200 may perform integrity verification on the corresponding data 810 by comparing the verification value 820 calculated based on the corresponding data 810 with the changed root value 720.

According to an embodiment, the device 200 determines whether an event identifier transmitted from the external device 130 is identical to an event identifier regarding the request to transmit the corresponding data 810 corresponding to the data identification value 520 from the target shard 500 and, when event identifiers are identical to each other, compare the verification value 820 calculated based on the corresponding data 810 with the changed root value 720, thereby performing integrity verification on the corresponding data 810.

In operation 1208, the device 200 may transmit a read result corresponding to the read request to the client 110.

Figure 13:
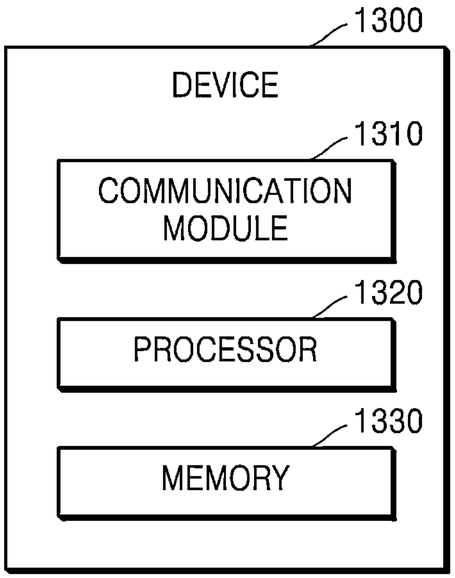
FIG. 13 is a block diagram showing a device for managing off-chain data according to an embodiment.

FIG. 13 is a block diagram showing a device for managing off-chain data according to an embodiment. Meanwhile, a device 1300 shown in FIG. 13 may correspond to the device 200 shown in FIG. 1.

Referring to FIG. 13, the device 1300 may include a communication module 1310, a processor 1320, and a memory 1330. FIG. 13 shows only the components of the device 1300 related to the embodiment. Therefore, one of ordinary skill in the art will understand that other general-purpose components may be included in addition to the components shown in FIG. 13.

The communication module 1310 may include at least one component enabling the device 1300 to perform wired/wireless communication with the client 110, other nodes constituting the blockchain network 120, the external device 130, the data storage system 140, and/or other external devices. For example, the communication module 1310 may include at least one of a short-range communication unit (not shown), a mobile communication unit (not shown), and a broadcast receiver (not shown).

The memory 1330 is hardware that stores various data processed within the device 1300, and may store programs for processing and control of the processor 1320.

The memory 1330 may include a random access memory (RAM), such as a dynamic random access memory (DRAM) and a static random access memory (SRAM), a read-only memory (ROM), an electrically erasable programmable read-only memory (EEPROM), a CD-ROM, a Blu-ray or another optical disc storage, a hard disk drive (HDD), a solid state drive (SSD), or a flash memory.

The processor 1320 controls the overall operation of the device 1300. For example, the processor 1320 may generally control the communication module 1310, the memory 1330, etc. by executing programs stored in the memory 1330. The processor 1320 may control the operation of the device 1300 by executing programs stored in the memory 1330.

The processor 1320 may control at least some of the operations of the device 1300 described above with reference to FIGS. 1 to 12.

For example, the processor 1320 may generate a first hash value regarding unit data by using a first hash function, determine a target shard to store the unit data from among a plurality of shards based on the first shard, control the communication module 1310 to transmit a first request for requesting to store the unit data in the target shard to the external device, and control the communication module to obtain the root value of the target shard changed as the unit data is stored from the external device.

Meanwhile, the specific example of the operation of the processor 1320 is identical to that described above with reference to FIGS. 1 to 12. Therefore, detailed description of the operation of the processor 1320 will be omitted below.

The processor 1320 may be implemented by using at least one from among application specific integrated circuits (ASICs), digital signal processors (DSPs), digital signal processing devices (DSPDs), programmable logic devices (PLDs), field programmable gate arrays (FPGAs), controllers, and micro-controllers, and other electrical units for performing functions.

According to an embodiment, the device 1300 may be a mobile electronic device. For example, device 1300 may include a computing device mounted on a vehicle. Here, the 'vehicle' may mean any type of transportation having an engine and used to move people or objects, such as a car, a bus, a motorcycle, a kickboard, or a truck. In another example, the device 1300 may be implemented as a smart phone, a tablet PC, a PC, a smart TV, a personal digital assistant (PDA), a laptop PC, a media player, a navigation device, and other mobile electronic devices.

According to another embodiment, device 1300 may be a server located outside a vehicle. A server may be implemented with a computer device or a plurality of computer devices that communicate over a network to provide commands, codes, files, content, services, etc.

According to another embodiment, at least one operation performed by the device 1300 may be performed by at least some of a mobile electronic device, an electronic device embedded in a vehicle, and a server located outside the vehicle.

Embodiments of the disclosure may be implemented in the form of a computer program that may be executed on a computer through various components, and such a computer program may be recorded on a computer-readable medium. Here, computer-readable media may include magnetic media such as a hard disk, a floppy disk, and a magnetic tape, optical recording media such as a CD-ROM and a DVD, magneto-optical media such as a floptical disk, and hardware devices specifically configured to store and execute program instructions, such as a ROM, a RAM, a flash memory, etc.

Meanwhile, the computer program may be specially designed and configured for example embodiments or may be published and available to one of ordinary skill in computer software. Examples of the computer program may include not only machine language codes generated by a compiler, but also high-level language codes executable by the computer via an interpreter, etc.

According to an embodiment, methods according to various embodiments of the disclosure may be provided included in a computer program product. A computer program product may be traded between a seller and a buyer as a product. A computer program product may be distributed in the form of a machine-readable storage medium (e.g. a compact disc read-only memory (CD-ROM)), through an application store (e.g. Play Store™), or between two user devices directly or online (e.g., downloading or uploading).

In the case of online distribution, at least a portion of a computer program product may be at least temporarily stored or temporarily generated in a machine-readable storage medium, such as a memory of a manufacturer's server, an application store's server, or a relay server.

Operations that constitute a method of the disclosure may be performed in any suitable order, unless explicitly stated to be done in an order described. The disclosure is not limited thereto. Furthermore, the use of all exemplary terms (e.g., etc.) is merely intended to be illustrative of technical ideas and is not to be construed as limiting the scope of the term unless further limited by the claims. It will also be appreciated by one of ordinary skill in the art that various modifications, combinations, and alterations may be made depending on design criteria and factors within the scope of the appended claims or equivalents thereof.

Therefore, the spirit of the disclosure should not be limited to the above-described embodiments, and the scope of the patent claims below as well as all scopes equivalent to or equivalently changed from the claims are within the scope of the spirit of the disclosure.

According to the problem-solving means of the disclosure described above, off-chain data may be reliably stored for effective storage expansion while ensuring the sustainability, the availability, and the integrity of data.

Also, according to the problem solving means of the disclosure, the load related to data access may be distributed through hash sharding using a hash value regarding data.

Also, according to the problem solving means of the disclosure, data may be efficiently accessed by using a URI regarding off-chain data, thereby implementing a decentralized web.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of operating a device that constitutes a blockchain network, the method comprising:

generating a first hash value regarding unit data using a first hash function and determining a target shard to store the unit data from among a plurality of shards based on the first hash value;

transmitting a first request to store the unit data in the target shard to an external device; and obtaining a changed root value of the target shard changed as the unit data is stored from the external device, wherein the root value represents entire data stored in the target shard the target shard stores data in a Merkle Tree structure, the unit data is stored in the target shard in association with a second hash value regarding the unit data generated by using a second hash function, and the second hash value is a leaf node constituting the Merkle Tree structure.

2. The method of claim 1, wherein, in the determining of the target shard, a shard having the remainder of the first hash value divided by a total number of the plurality of shards as a shard identification value is determined as the target shard.

3. The method of claim 2, wherein, in the determining of the target shard, a write request regarding the unit data is received from a client and the target shard is determined in response to the write request, and the write request comprises a request to invoke a write function of a smart contract.

4. The method of claim 3, wherein the obtaining comprises:

obtaining a data identification value corresponding to the unit data and the changed root value from the external device; and storing the data identification value and the changed root value as metadata linked to the smart contract.

5. The method of claim 4, wherein, in the storing as metadata, a Uniform Resource Identifier (URI) to identify a stored location of the unit data is stored, and the URI is generated based on the shard identification value and the data identification value.

6. The method of claim 5, wherein the URI comprises account information regarding an account that owns the unit data.

7. The method of claim 1, further comprising receiving a read request regarding the unit data from a client and determining the target shard by using the first hash function in response to the read request, wherein the read request comprises a request to invoke a read function of a smart contract.

8. The method of claim 7, further comprising:

obtaining a data identification value corresponding to the unit data by referring to the metadata linked to the smart contract;

transmitting a second request for requesting the target shard to transmit data corresponding to the data identification value to the external device; and obtaining the corresponding data from the external device.

9. The method of claim 8, further comprising:

performing integrity verification on the corresponding data by comparing a verification value calculated based on the corresponding data with the root value; and transmitting the corresponding data on which the integrity verification is performed to the client.

10. The method of claim 1, wherein the external device comprises a device corresponding to the target shard from among a plurality of devices respectively corresponding to the plurality of shards, and the plurality of devices each comprise a device capable of accessing data stored in a corresponding shard.

11. A device that constitutes a blockchain network, the device comprising:

a communication module configured to communicate with an external device;

a main memory in which at least one program is stored; and a processor configured to operate by executing the at least one program, wherein the processor is configured to generate a first hash value regarding unit data using a first hash function and determine a target shard to store the unit data from among a plurality of shards based on the first hash value, control the communication module to transmit a first request to store the unit data in the target shard to an external device, and control the communication module to obtain a changed root value of the target shard changed as the unit data is stored from the external device, wherein the root value represents entire data stored in the target shard the target shard stores data in a Merkle Tree structure, the unit data is stored in the target shard in association with a second hash value regarding the unit data generated by using a second hash function, and the second hash value is a leaf node constituting the Merkle Tree structure.

12. A computer-readable recording medium having recorded thereon a program for causing the method of claim 1 to be executed on a computer.

* * * * *